US012675527B2

(12) United States Patent (10) Patent No.: US 12,675,527 B2
Gangopadhya et al. (45) Date of Patent: Jul. 7, 2026

(54) SYSTEMS AND METHODS FOR REACHABILITY OF DIFFERENT DESTINATIONS

(71) Applicant: VIA TRANSPORTATION, INC., New York, NY (US)

(72) Inventors: Raja Gangopadhya, Oakland, CA (US); Caitlin Hewitt Proctor, San Francisco, CA (US); Hari Narayanan, Oakland, CA (US); Stuart Campbell, Kensington (AU); Minh Quan Huynh, Oakland, CA (US); Krithin Sitaram, San Francisco, CA (US); Yeying Huang, San Francisco, CA (US); Rebekah Watkins, Castro Valley, CA (US)

(73) Assignee: VIA TRANSPORTATION, INC., New York, NY (US)

( * ) Notice: Subject to any disclaimer, the term of this patent is extended or adjusted under 35 U.S.C. 154(b) by 0 days.

(21) Appl. No.: 18/425,279

(22) Filed: Jan. 29, 2024

(65) Prior Publication Data

US 2024/0220540 A1     Jul. 4, 2024

(51) Int. Cl.
*G06F 16/00*          (2019.01)
*G06F 16/29*          (2019.01)
(Continued)

(52) U.S. Cl.
CPC .......... *G06F 16/9024* (2019.01); *G06F 16/29* (2019.01); *G06Q 50/40* (2024.01)

(58) Field of Classification Search
None
See application file for complete search history.

(56) References Cited

U.S. PATENT DOCUMENTS 4,212,069 A     7/1980  Baumann
4,502,123 A     2/1985  Minami et al.
(Continued)

FOREIGN PATENT DOCUMENTS

CA        2874200       11/2013
CN      103198647        7/2013
(Continued)

OTHER PUBLICATIONS

Ma, Shuo et al. T-Share: A large scale dynamic taxi ridesharing service, 2013, IEEE, Proceedings of the 29th International Conference on Data Engineering (ICDC0, 2016, pp. 410-421 (year 2013).
(Continued)

*Primary Examiner* — Anhtai V Tran
(74) *Attorney, Agent, or Firm* — PEARL COHEN ZEDEK LATZER BARATZ LLP

(57)          ABSTRACT

A system and method for predicting stats for different destinations is provided. The system and method can include receiving a dataset of stats in a spatial format and a request for stats in a geographical area. The system and method can include determining a grid of cells based on the geographical area, determining an origin point in each cell in the grid of cell, determining a graph based on the grid of cells, determining a proportion of the stat to assign to each node, edge or both in the graph in the geographical area based on an overlap between the dataset of stats and the graph, and determining a total for the stat for the geographical area.

18 Claims, 10 Drawing Sheets

(51) Int. Cl.
 *G06F 16/901* (2019.01)
 *G06Q 50/40* (2024.01)

(56) References Cited

U.S. PATENT DOCUMENTS

| | | | |
|---|---|---|---|
| 4,528,679 | A | 7/1985 | Shahbaz |
| 5,604,676 | A | 2/1997 | Penzias |
| 5,897,629 | A | 4/1999 | Shinagawa |
| 6,459,986 | B1 | 10/2002 | Boyce |
| 7,136,747 | B2 | 11/2006 | Raney |
| 7,146,270 | B2 | 12/2006 | Nozaki |
| 8,082,095 | B2 | 12/2011 | Sumcad et al. |
| 8,220,710 | B2 | 7/2012 | Hoffman |
| 8,412,400 | B2 | 4/2013 | D'Andrea |
| 8,520,695 | B1 | 8/2013 | Rubin |
| 8,538,694 | B2 | 9/2013 | Conway |
| 8,688,532 | B2 | 4/2014 | Khunger et al. |
| 8,799,038 | B2 | 8/2014 | Chen |
| 8,868,529 | B2 | 10/2014 | Lerenc |
| 8,930,133 | B2 | 1/2015 | Wurman |
| 9,068,851 | B2 | 6/2015 | Lerenc |
| 9,074,904 | B1 | 7/2015 | Huang et al. |
| 9,094,824 | B2 | 7/2015 | Jayanthi |
| 9,304,009 | B2 | 4/2016 | Beaurepaire et al. |
| 9,322,661 | B2 | 4/2016 | Wechsler |
| 9,441,981 | B2 | 9/2016 | Sweeney |
| 9,448,560 | B2 | 9/2016 | D'Andrea |
| 9,494,439 | B1 | 11/2016 | Ross et al. |
| 9,562,785 | B1 | 2/2017 | Racah et al. |
| 9,599,481 | B2 | 3/2017 | Lord et al. |
| 9,679,489 | B2 | 6/2017 | Lambert |
| 9,689,694 | B2 | 6/2017 | Lord |
| 9,706,367 | B2 | 7/2017 | Tao |
| 9,720,415 | B2 | 8/2017 | Levinson |
| 9,903,721 | B2 | 2/2018 | Choi |
| 9,939,279 | B2 | 4/2018 | Pan |
| 9,965,960 | B1 | 5/2018 | Mc Davitt-Van Fleet |
| 10,082,793 | B1 | 9/2018 | Lin |
| 10,152,053 | B1 | 12/2018 | Smith |
| 10,156,848 | B1 | 12/2018 | Konrardy et al. |
| 10,168,168 | B2 | 1/2019 | Rakah |
| 10,235,888 | B2 | 3/2019 | Moreira-Matias |
| 10,248,913 | B1 | 4/2019 | Gururajan |
| 10,467,554 | B2 | 11/2019 | Yoo |
| 10,572,964 | B2 | 2/2020 | Kim |
| 10,648,822 | B2 | 5/2020 | Newlin |
| 10,677,602 | B2 | 6/2020 | Copeland |
| 10,762,447 | B2 | 9/2020 | Kislovskiy |
| 11,062,416 | B1 | 7/2021 | Jang |
| 11,361,594 | B1 | 6/2022 | Ramalho De Oliveira |
| 11,466,998 | B1 | 10/2022 | Williams |
| 11,574,263 | B2 | 2/2023 | Shoval |
| 11,614,751 | B2 | 3/2023 | Alonso-Mora |
| 11,620,592 | B2 | 4/2023 | Ramot |
| 11,663,532 | B2 | 5/2023 | Shimodaira |
| 11,674,811 | B2 | 6/2023 | Shoval |
| 11,860,911 | B2 | 1/2024 | Dong |
| 11,922,816 | B1 | 3/2024 | Hansen |
| 12,033,194 | B2 | 7/2024 | Fujimoto |
| 2001/0037174 | A1 | 11/2001 | Dickerson |
| 2002/0011940 | A1 | 1/2002 | Cappel |
| 2003/0177020 | A1 | 9/2003 | Okamura |
| 2004/0076280 | A1 | 4/2004 | Anso |
| 2004/0088392 | A1 | 5/2004 | Barrett |
| 2004/0093280 | A1 | 5/2004 | Yamaguchi |
| 2004/0158483 | A1 | 8/2004 | Lecouturier |
| 2004/0215382 | A1 | 10/2004 | Breed |
| 2004/0254721 | A1 | 12/2004 | Saiki |
| 2005/0021227 | A1 | 1/2005 | Matsumoto |
| 2005/0280555 | A1 | 12/2005 | Warner, IV |
| 2006/0059023 | A1 | 3/2006 | Mashinsky |
| 2006/0106655 | A1 | 5/2006 | Lettovsky et al. |
| 2006/0178949 | A1 | 8/2006 | McGrath |
| 2006/0208169 | A1 | 9/2006 | Breed |
| 2006/0276960 | A1 | 12/2006 | Adamczyk |
| 2007/0164726 | A1 | 7/2007 | de Marcken et al. |
| 2007/0168239 | A1 | 7/2007 | Marcken et al. |
| 2007/0248220 | A1 | 10/2007 | Crandell |
| 2008/0015923 | A1 | 1/2008 | Masaba |
| 2008/0027772 | A1 | 1/2008 | Gernega et al. |
| 2008/0152036 | A1 | 6/2008 | Suzuki |
| 2008/0189207 | A1 | 8/2008 | Wurster |
| 2008/0195428 | A1 | 8/2008 | O'Sullivan |
| 2008/0270204 | A1 | 10/2008 | Poykko |
| 2008/0277183 | A1 | 11/2008 | Huang et al. |
| 2009/0005963 | A1 | 1/2009 | Jarvinen |
| 2009/0049044 | A1 | 2/2009 | Mitchell |
| 2009/0083111 | A1 | 3/2009 | Carr |
| 2009/0140887 | A1 | 6/2009 | Breed |
| 2009/0177502 | A1 | 7/2009 | Doinoff |
| 2009/0192851 | A1 | 7/2009 | Bishop |
| 2009/0210276 | A1 | 8/2009 | Krumm et al. |
| 2009/0216600 | A1 | 8/2009 | Hill |
| 2009/0248587 | A1 | 10/2009 | Van Buskirk |
| 2009/0254405 | A1 | 10/2009 | Hollis |
| 2009/0271227 | A1 | 10/2009 | Hayat |
| 2009/0327011 | A1 | 12/2009 | Petroff |
| 2010/0030594 | A1 | 2/2010 | Swart |
| 2010/0280884 | A1 | 11/2010 | Levine |
| 2010/0299177 | A1 | 11/2010 | Buczkowski et al. |
| 2010/0323657 | A1 | 12/2010 | Barnard |
| 2011/0099040 | A1 | 4/2011 | Felt |
| 2011/0125395 | A1 | 5/2011 | Mathews |
| 2011/0130916 | A1 | 6/2011 | Mayer |
| 2011/0130954 | A1 | 6/2011 | D'Andrea |
| 2011/0153629 | A1 | 6/2011 | Lehmann |
| 2011/0191017 | A1 | 8/2011 | Certin |
| 2011/0195699 | A1 | 8/2011 | Tadayon |
| 2011/0213629 | A1 | 9/2011 | Clark |
| 2011/0238457 | A1 | 9/2011 | Mason |
| 2011/0288765 | A1 | 11/2011 | Conway |
| 2011/0301985 | A1 | 12/2011 | Camp et al. |
| 2012/0010912 | A1 | 1/2012 | Lele |
| 2012/0041675 | A1 | 2/2012 | Juliver |
| 2012/0078672 | A1 | 3/2012 | Mohebbi et al. |
| 2012/0109721 | A1 | 5/2012 | Cebon |
| 2012/0232943 | A1 | 9/2012 | Myr |
| 2012/0239452 | A1 | 9/2012 | Trivedi |
| 2012/0290652 | A1 | 11/2012 | Boskovic |
| 2013/0006464 | A1 | 1/2013 | Speiser |
| 2013/0046586 | A1 | 2/2013 | Lerner et al. |
| 2013/0046795 | A1* | 2/2013 | Borgerson .......... G06F 16/9024 707/E17.011 |
| 2013/0054281 | A1 | 2/2013 | Thakkar et al. |
| 2013/0060468 | A1 | 3/2013 | Delling |
| 2013/0060586 | A1 | 3/2013 | Chen |
| 2013/0073327 | A1 | 3/2013 | Edelberg |
| 2013/0096827 | A1 | 4/2013 | McCall et al. |
| 2013/0102333 | A1 | 4/2013 | Dam |
| 2013/0110385 | A1 | 5/2013 | Heed et al. |
| 2013/0132140 | A1 | 5/2013 | Amin et al. |
| 2013/0132369 | A1 | 5/2013 | Delling et al. |
| 2013/0159028 | A1 | 6/2013 | Lerenc et al. |
| 2013/0173205 | A1 | 7/2013 | Van Houten |
| 2013/0179205 | A1 | 7/2013 | Slinin |
| 2013/0218455 | A1 | 8/2013 | Clark |
| 2013/0231965 | A1 | 9/2013 | Tokatly |
| 2013/0238167 | A1 | 9/2013 | Stanfield et al. |
| 2014/0011522 | A1 | 1/2014 | Lin et al. |
| 2014/0052481 | A1 | 2/2014 | Monteil |
| 2014/0074757 | A1 | 3/2014 | De Gennaro et al. |
| 2014/0082069 | A1 | 3/2014 | Varoglu |
| 2014/0129302 | A1 | 5/2014 | Amin |
| 2014/0129951 | A1 | 5/2014 | Amin |
| 2014/0172727 | A1 | 6/2014 | Abhyanker |
| 2014/0173511 | A1 | 6/2014 | Lehmann et al. |
| 2014/0180773 | A1 | 6/2014 | Zafiroglu et al. |
| 2014/0188775 | A1 | 7/2014 | Lehmann |
| 2014/0214322 | A1 | 7/2014 | Tsimhoni |
| 2014/0229255 | A1 | 8/2014 | Scofield |
| 2014/0236413 | A1 | 8/2014 | D'Andrea |
| 2014/0278616 | A1 | 9/2014 | Stone |
| 2014/0323167 | A1 | 10/2014 | Spearritt |
| 2014/0324505 | A1 | 10/2014 | Lerenc et al. |

(56)  References Cited

U.S. PATENT DOCUMENTS

| | | |
|---|---|---|
| 2014/0365250 A1 | 12/2014 | Ikeda |
| 2015/0006072 A1 | 1/2015 | Goldberg |
| 2015/0095122 A1 | 4/2015 | Eramian |
| 2015/0100238 A1 | 4/2015 | Cai et al. |
| 2015/0112585 A1 | 4/2015 | Knepper |
| 2015/0161554 A1 | 6/2015 | Sweeney et al. |
| 2015/0161564 A1 | 6/2015 | Sweeney et al. |
| 2015/0204684 A1 | 7/2015 | Rostamian et al. |
| 2015/0206437 A1 | 7/2015 | Fowler |
| 2015/0219464 A1 | 8/2015 | Beaurepaire et al. |
| 2015/0242944 A1 | 8/2015 | Willard |
| 2015/0248689 A1 | 9/2015 | Paul |
| 2015/0294430 A1 | 10/2015 | Huang |
| 2015/0310378 A1 | 10/2015 | van der Berg |
| 2015/0310379 A1 | 10/2015 | Farrelly et al. |
| 2015/0324717 A1 | 11/2015 | Lord |
| 2015/0324718 A1 | 11/2015 | Lord |
| 2015/0324945 A1 | 11/2015 | Lord et al. |
| 2015/0345951 A1 | 12/2015 | Dutta et al. |
| 2016/0021154 A1 | 1/2016 | Schoeffler |
| 2016/0027306 A1 | 1/2016 | Lambert |
| 2016/0027307 A1 | 1/2016 | Abhyanker |
| 2016/0034845 A1 | 2/2016 | Hiyama |
| 2016/0069694 A1 | 3/2016 | Glaser |
| 2016/0123756 A1 | 5/2016 | Becker |
| 2016/0171574 A1 | 6/2016 | Paulucci |
| 2016/0209220 A1 | 7/2016 | Laetz |
| 2016/0210675 A1 | 7/2016 | Smart |
| 2016/0231128 A1 | 8/2016 | Marks |
| 2016/0253599 A1 | 9/2016 | Lang |
| 2016/0320194 A1 | 11/2016 | Abhyanker |
| 2016/0320195 A1 | 11/2016 | Hansen |
| 2016/0321771 A1 | 11/2016 | Liu et al. |
| 2016/0335576 A1 | 11/2016 | Peng |
| 2016/0349067 A1 | 12/2016 | Fowe |
| 2016/0356615 A1 | 12/2016 | Arata |
| 2016/0358471 A1 | 12/2016 | Hajj |
| 2016/0361970 A1 | 12/2016 | Pebbles |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0039488 A1 | 2/2017 | Raghunathan |
| 2017/0059334 A1 | 3/2017 | Mukherjee |
| 2017/0098377 A1 | 4/2017 | Marco |
| 2017/0116696 A1 | 4/2017 | Lambert |
| 2017/0132540 A1 | 5/2017 | Hapamas |
| 2017/0138749 A1 | 5/2017 | Pan |
| 2017/0146350 A1 | 5/2017 | Beauepaire |
| 2017/0153714 A1 | 6/2017 | Gao et al. |
| 2017/0167882 A1 | 6/2017 | Ulloa et al. |
| 2017/0169366 A1 | 6/2017 | Klein |
| 2017/0176993 A1 | 6/2017 | Kato |
| 2017/0185948 A1 | 6/2017 | Magazinik et al. |
| 2017/0192437 A1 | 7/2017 | Bier |
| 2017/0227371 A1 | 8/2017 | O'Mahony |
| 2017/0243492 A1 | 8/2017 | Lambert et al. |
| 2017/0248963 A1 | 8/2017 | Levinson et al. |
| 2017/0284819 A1 | 10/2017 | Donnelly |
| 2017/0286884 A1 | 10/2017 | Shoval |
| 2017/0293635 A1* | 10/2017 | Peterson ............. G06F 16/2477 |
| 2017/0293925 A1 | 10/2017 | Marueli et al. |
| 2017/0300049 A1 | 10/2017 | Seally |
| 2017/0300053 A1 | 10/2017 | Wengreen et al. |
| 2017/0301054 A1 | 10/2017 | Sangoi et al. |
| 2017/0313208 A1 | 11/2017 | Lindsay |
| 2017/0365030 A1 | 12/2017 | Shoham et al. |
| 2018/0032928 A1 | 2/2018 | Li |
| 2018/0046944 A1 | 2/2018 | Barbera |
| 2018/0073882 A1 | 3/2018 | North |
| 2018/0080263 A1 | 3/2018 | Rose |
| 2018/0087915 A1 | 3/2018 | Marco |
| 2018/0091604 A1 | 3/2018 | Yamashita |
| 2018/0096606 A1 | 4/2018 | Rakah |
| 2018/0113880 A1 | 4/2018 | Metcalf-Putnam |
| 2018/0121847 A1 | 5/2018 | Zhao |
| 2018/0135993 A1 | 5/2018 | Thangaraj |
| 2018/0136005 A1 | 5/2018 | Forutanpour |
| 2018/0181128 A1 | 6/2018 | Urano |
| 2018/0189682 A1 | 7/2018 | Seacat |
| 2018/0191863 A1 | 7/2018 | Matthieson et al. |
| 2018/0197418 A1 | 7/2018 | Chu |
| 2018/0209803 A1 | 7/2018 | Rakah |
| 2018/0209804 A1 | 7/2018 | Rakah et al. |
| 2018/0209805 A1 | 7/2018 | Rakah |
| 2018/0211124 A1 | 7/2018 | Alonso-Mora |
| 2018/0211186 A1 | 7/2018 | Rakah |
| 2018/0211218 A1 | 7/2018 | Berdinis |
| 2018/0211228 A1 | 7/2018 | Narayan |
| 2018/0211541 A1 | 7/2018 | Rakah |
| 2018/0224866 A1 | 8/2018 | Alonso-Mora |
| 2018/0231984 A1 | 8/2018 | Alonso-Mora |
| 2018/0251122 A1 | 9/2018 | Golston |
| 2018/0259976 A1 | 9/2018 | Williams |
| 2018/0260787 A1 | 9/2018 | Xi |
| 2018/0290610 A1 | 10/2018 | Zych |
| 2018/0338225 A1 | 11/2018 | Shimizu |
| 2018/0340790 A1 | 11/2018 | Kislovskiy et al. |
| 2018/0342035 A1 | 11/2018 | Sweeney |
| 2018/0342165 A1 | 11/2018 | Tao |
| 2018/0348772 A1 | 12/2018 | Stefan |
| 2018/0356239 A1 | 12/2018 | Marco |
| 2018/0376305 A1 | 12/2018 | Liu |
| 2019/0017839 A1 | 1/2019 | Liu |
| 2019/0056233 A1 | 2/2019 | Liu |
| 2019/0086221 A1 | 3/2019 | Thiyagarajan |
| 2019/0108468 A1 | 4/2019 | Mguyen |
| 2019/0114595 A1 | 4/2019 | Eyler |
| 2019/0114638 A1 | 4/2019 | Flores |
| 2019/0120640 A1 | 4/2019 | Ho |
| 2019/0122561 A1 | 4/2019 | Shimizu |
| 2019/0156254 A1 | 5/2019 | Gururajan |
| 2019/0156451 A1 | 5/2019 | Kitagishi |
| 2019/0156646 A1 | 5/2019 | Richey |
| 2019/0171943 A1 | 6/2019 | Pao et al. |
| 2019/0172129 A1 | 6/2019 | Bhattacharjee |
| 2019/0188608 A1 | 6/2019 | Gururajan |
| 2019/0195639 A1 | 6/2019 | Malewicz |
| 2019/0197132 A1 | 6/2019 | Sharma |
| 2019/0204096 A1 | 7/2019 | Cai |
| 2019/0204097 A1 | 7/2019 | Starns |
| 2019/0205842 A1 | 7/2019 | Starns |
| 2019/0206258 A1 | 7/2019 | Chang et al. |
| 2019/0212149 A1 | 7/2019 | Ho |
| 2019/0259182 A1 | 8/2019 | Sarukkai et al. |
| 2019/0265059 A1 | 8/2019 | Warnick |
| 2019/0271552 A1 | 9/2019 | Choi et al. |
| 2019/0311307 A1 | 10/2019 | Ramot |
| 2019/0325757 A1 | 10/2019 | Goel |
| 2020/0010090 A1 | 1/2020 | Matsuda |
| 2020/0019894 A1 | 1/2020 | Jin |
| 2020/0042019 A1 | 2/2020 | Marczuk |
| 2020/0082314 A1 | 3/2020 | Crapis |
| 2020/0104965 A1 | 4/2020 | Ramot |
| 2020/0151291 A1 | 5/2020 | Bhattacharya |
| 2020/0151631 A1 | 5/2020 | Lamers |
| 2020/0151885 A1 | 5/2020 | Yang |
| 2020/0160476 A1 | 5/2020 | Ramot |
| 2020/0160477 A1 | 5/2020 | Ramot |
| 2020/0160478 A1 | 5/2020 | Ramot |
| 2020/0160705 A1 | 5/2020 | Chase |
| 2020/0160709 A1 | 5/2020 | Ramot |
| 2020/0160718 A1 | 5/2020 | Saleh |
| 2020/0174487 A1 | 6/2020 | Viswanathan |
| 2020/0191584 A1 | 6/2020 | Kamata |
| 2020/0193834 A1 | 6/2020 | Qin |
| 2020/0273328 A1 | 8/2020 | Muberek |
| 2020/0279195 A1 | 9/2020 | Kobori |
| 2020/0286199 A1 | 9/2020 | Maddipati |
| 2020/0286391 A1 | 9/2020 | Beaurepaire |
| 2020/0333146 A1 | 10/2020 | Shoval |
| 2020/0334987 A1 | 10/2020 | Shoval |
| 2020/0349666 A1 | 11/2020 | Hodge |
| 2020/0361406 A1 | 11/2020 | Zych |

(56) References Cited

U.S. PATENT DOCUMENTS

| 2020/0364627 A1 | 11/2020 | Qin |
| 2020/0393256 A1 | 12/2020 | Sahin |
| 2020/0410555 A1 | 12/2020 | ElShenawy |
| 2021/0020047 A1 | 1/2021 | Kuhn |
| 2021/0073825 A1 | 3/2021 | Walling |
| 2021/0089986 A1 | 3/2021 | Carvalho |
| 2021/0148720 A1 | 5/2021 | Yasui |
| 2021/0173855 A1 | 6/2021 | Liu |
| 2021/0223051 A1 | 7/2021 | Hochberg et al. |
| 2021/0248520 A1 | 8/2021 | Krishnamurthy et al. |
| 2021/0250232 A1 | 8/2021 | Mahimkar |
| 2021/0264381 A1 | 8/2021 | Crudele et al. |
| 2021/0295706 A1 | 9/2021 | Shoval |
| 2021/0302175 A1 | 9/2021 | Pishdadian |
| 2021/0403004 A1 | 12/2021 | Alvarez et al. |
| 2022/0003561 A1 | 1/2022 | Shoval |
| 2022/0027818 A1 | 1/2022 | Jin |
| 2022/0120572 A9 | 4/2022 | Shoval |
| 2022/0164364 A1* | 5/2022 | Funk ..................... G06F 16/26 |
| 2022/0164911 A1 | 5/2022 | Stumpf |
| 2023/0119116 A1 | 4/2023 | Xu |
| 2023/0394613 A1 | 12/2023 | Marcovitch |
| 2024/0232273 A1* | 7/2024 | Pana ................... G06F 16/9537 |

FOREIGN PATENT DOCUMENTS

| CN | 103279669 | 9/2013 |
| CN | 103327440 | 9/2013 |
| CN | 104751625 | 7/2015 |
| EP | 2605149 | 6/2013 |
| EP | 2665050 | 11/2013 |
| EP | 2792538 | 10/2014 |
| EP | 3023740 | 5/2016 |
| EP | 3472563 | 4/2019 |
| EP | 3574459 | 12/2019 |
| EP | 3631707 | 4/2020 |
| EP | 3640596 | 4/2020 |
| EP | 3659078 | 6/2020 |
| EP | 3738085 | 11/2020 |
| EP | 3776395 | 2/2021 |
| ES | 2525738 | 12/2014 |
| GB | 2397683 | 7/2004 |
| JP | 2003006294 | 1/2003 |
| JP | 2003233656 | 8/2003 |
| JP | 2003271706 | 9/2003 |
| JP | 2003281422 | 10/2003 |
| JP | 2004062490 | 2/2004 |
| JP | 2004192366 | 7/2004 |
| JP | 2004362271 | 12/2004 |
| JP | 2009-069117 | 4/2009 |
| JP | 2010231258 | 10/2010 |
| JP | 2011214930 | 10/2011 |
| JP | 2019525299 | 9/2019 |
| JP | 2020522789 | 7/2020 |
| KR | 20090044693 | 5/2009 |
| KR | 20100053717 | 5/2010 |
| KR | 101752159 | 6/2017 |
| KR | 102064376 | 2/2020 |
| KR | 20210155209 | 12/2021 |
| SG | 2012065264 | 4/2014 |
| WO | WO2006128946 | 12/2006 |
| WO | WO2011066468 | 6/2011 |
| WO | WO2012143300 | 10/2012 |
| WO | WO2014106617 | 7/2014 |
| WO | WO2016209595 | 12/2016 |
| WO | WO2017223031 | 12/2017 |
| WO | WO2018140505 | 8/2018 |
| WO | WO2018217640 | 11/2018 |
| WO | WO2019023324 | 1/2019 |
| WO | WO2019136341 | 7/2019 |
| WO | WO2019199766 | 10/2019 |
| WO | WO-2020/060958 | 3/2020 |

OTHER PUBLICATIONS

Wen He; Kai Hwang; Deyi Li, Intelligent carpool routing for urban ridesharing by mining GPS trajectories, IEEE Transactions on intelligent transportation systems; year 2014, vol. 15, issue 5, pp. 2286-2296; DOI 10.1109/TITS.2014.2315521.

Dejan Dimitrijevic, Nernanja Nedjc, Vladimir Dimitrieski, Real-time carpooling and ride-sharing: Position paper design concepts, distribution and cloud computing strategies; Computer Science and Information Systems (FedCSIS) 2013 Federated Conference on year 2013, pp. 781-786; Referenced in IEEE Conference Publications.

Harini Sirisena, Ride Buddies-Multi agent system for ride sharing/carpooling; Advances in ICT for Emerging Regions (ICTer) 2014 International Conference year 2014; pp. 252-252, DOI:10.1109/ICTER.2014.7083910: Referenced IEEE Conference Publications.

Chung-Min Chen, David Shallcross, Yunng-Chien Shih. Yen-Ching Wu, Sheng-Po Kou, Yuan-Ying Hsi, Yuhsiang Holderby, William Chou, Smart ride share with flexible route matching: Chung-Min Chen, David Shallcross, Advanced Communication Technology (ICACT) 2011, 13th International Conference, pp. 1506-1510.

Nianbo Liu; Ming Liu; Jiannong Cao; Guihai Chen; Wei Lou, When transportation meets communication: V2P over VANETs; Distributed Computing Systems (ICDCS) 2010 IEEE 30th International Conference year 2010, pp. 567-576, DOI:10.1109/ICDCS.2010.83.

Li et al., A dynamic pricing method for carpooling service based on coalition at game analysis; 2016 IEEE 18th Intern Conf on High Performance Computing and Comm; IEEE 14th Intern Conf on Smart City IEEE 2nd Intern Conf on Data Science and Systems (hpcc/SmartCity/dss 9HPCC/Smartcity/DSS) year 2016 pp. 78-85; DOI:10.1109/HPCC-Smart City-DSS) year 2016, pp. 78-85, DOI:10.1109/HPCC-SmartCity-DSS.2016.0022.

Lasse Korsholm Poulsen, Daan Dekkers, Nicolaas Wagenaar; Wesley Snijders; Ben Lewinsky; Raghava Rao Mukkamala; Ravi Valrapu; Green cabs vs. Uber in New York City, 2016 IEEE international Congress on Big Data (BigDataCongress) Year 2016:pp222-229, DOI: 10.1109/BigDataCongress.2016.35.

Hawkins, Andrew, Uberhop is Uber's Latest idea for killing mass transit, Dec. 8, 2015, The Verge, p. 1-4.

Alonso-Mora, Javier et al. "On-Demand High-Capacity Ride-Sharing via Dynamic Trip-Vehicle Assignment." Proceedings of the National Academy of Sciences 114, 3 (Jan. 2017): 462-467 © 2017 National Academy of Sciences.

Mora, Supplemental Material—On Demand high-capacity ride-sharing via dynamic trip-vehicle assignment, Jul. 20, 2016, p. 1-36.

Whitney, Alyse, I took Via to work every day for a month. Here's what I learned, May 10, 2016, p. 1-3.

Y. Hou, W. Zhong, L. Su, K. Hulme, A. W. Sadek and Qiao, "TASeT: Improving the Efficiency of Electric Taxis With Transfer-Allows Rideshare", in IEEE Transactions on Vehicular Technology, vol. 56., No. 12, pp. 9518-9528, Dec. 2016, doi:10.1109//TVT.2016.2592983. (Year 2016).

Agatz, Niels, et al. "Optimization for dynamic ride-sharing: A review." European Journal of Operational Research 223.2 (2012): 295-303 (year:2012).

Paz Linares M. et al. A simulation framework for real-time assessment of dynamicride sharing demand responsive transportation models, Dec. 11, 2016; Dec. 11, 2016-Dec. 14, 2016, Dec. 11, 2016, pp. 2216-2227, XP058310070, DOI:10.1109/WSC.2016.7822263 ISBN: 987-1-5090-4484-9.

Baouche et al, Efficient Allocation of Electric Vehicle Charging Stations . . . Year 2014.

I. Portugal et al., A Framework for spatial-Temporal Trajectory Cluster Analysis based on Dynamic Relationships, IEEE Access, vol. 8, pp. 169775-169793, 2020.

Ridesharing in North America: Past, Present, and Future, by Nelson D. Chan and Susan Shaheen, published in Transport Reviews, vol. 32, No. 1, 93-112, Jan. 2012.

Los Angeles Smart Traveler Field Operational Test Evaluation, Genevieve Giuliano, Randolph W. Hall, and Jacqueline M. Golob, University of Southern California, California PATH Research Report UCB-ITS-PRR-95-41, Dec. 1995.

(56) References Cited

OTHER PUBLICATIONS

Seattle Smart Traveler, Daniel J. Dailey, Donald Loseff, David Meyers, Washington State Transportation Center (TRAC), Oct. 1997, Cite Only.

Dynamic Taxi-sharing Service Using Intelligent Transportation System Technologies, Chi-Chung Tao, IEEE, 3209-3212, 2007.

A Survey of Mobile Phone Sensing, Nicholas D. Lane, Emiliano Miluzzo, Hong Lu, Daniel Peebles, Tanzeem Choudhury, and Andrew T. Campbell, IEEE Communications Magazine, 140-150, Sep. 2010.

The Research and Implementation of GPS Intelligent Transmission Strategy Based Jon on-board Android Smartphones, Zhiqiang Wei, Yaqing Song, Hao Liu, Yanxiu Sheng, and Xi Wang, IEEE, 1230-1233, 2013, Abstract Only.

Smarter transportation case study #10: Dynamic Ridesharing in Cork., Transportation for America, https://web.archive.org/web/20111007214904/http://t4america.org/blog/2...ter-transportation-case-study-10-dynamic-ridesharing-in-cork-ireland/, Crawled 2011, Retrieved Nov. 15, 2021.

Avego Real-Time Ridesharing, Avego Ltd., https://web.archive.org/web/20111021225957/http://www.avego.com:80/st/realtime.php , Crawled 2011, Retrieved Nov. 15, 2021.

Avego Introduction, Avego Ltd., https://web.archive.org/web/20111102165609/http://www.avego.com:80/st/index.php, Crawled 2011, Retrieved Nov. 15, 2021.

Understanding the NAVSTAR GPS, GIS, and IVHS 2nd Edition, Tom Logsdon, Van Nostrand Reinhold, 1995.

Behind the Success of the CVCC Engine, Honda Worldwide, https://web.archive.org/web/20070219081359/http://world.honda.com/history/challenge/1981navigationsystem/text/01.html, Crawled 2007, Retrieved Dec. 13, 2021.

The Final Test: From Suzuka to Tokyo, Honda Worldwide, https://web.archive.org/web/20070221131328/http://world.honda.com/history/challenge/1981navigationsystem/text/06.html, Crawled 2007, Retrieved Dec. 13, 2021.

Creating a Progressive Strategy, Honda Worldwide, https://web.archive.org/web/20070221131445/http://world.honda.com/history/challenge/1981navigationsystem/text/02.html, Crawled 2007, Retrieved Dec. 13, 2021.

Map Navigation Software of the Electro-Multivision of the '91 Toyota Soarer, Kunihiro Ishikawa, Michima Ogawa, Shiegtoshi Azuma, and Tooru Ito, IEEE Vehicle Navigation and Information Systems Conference, 463-473, 1991.

Automobile Navigation: Where is it Going?, Robert L. French, IEEE Aerospace and Electronic Systems Magazine, vol. 2, Issue: 5, 6-12, May 1987.

TravTek Global Evaluation and Executive Summary, V.W. Inman and J.I. Peters, U.S. Department of Transportation Federal Highway Administration, Pub. No. FHWA-RD-96-031, Mar. 1996.

TravTek System Architecture Evaluation, C. Blumentritt, K. Balke, E. Symour, and R. Sanchez, U.S. Department of Transportation Federal Highway Administration, Pub. No. FHWARD-94-141, Jul. 1995.

Historical overview of automobile navigation technology, Robert L. French, 36th IEEE Vehicular Technology Conference, 1986.

A Qualitative and Quantitative Analysis of Real Time Traffic Information Providers, Tim Paul Bauer, Janick Edinger, and Christian Becker, Proceedings of the 4th IEEE International Workshop on Pervasive Context, 2019.

The Dynamic Traffic Information Collection and Processing Methods of ITS Common Information Platform Based on Floating Car Technology, Haowei Su and Wei Zhang, IEEE 2008 International Seminar on Future BioMedical Information Engineering, 156-159, 2008.

Schreieck et al. A Matching Algorithm for Dynamic Ridesharing, Transportation Research Procedia, 19, 2016 ,272-285.

Gruebele, P. "Interactive system for real time dynamic multi-hop carpooling." Global Transport Knowledge Partnership (2008): 1-17.

Horn, Mark et Procedures for planning multi-leg journeys with fixed-route and demand-responsive passenger transport services, Transportation Research Part C:Emerging Technologies 12.1 (2004):33-55 (Year: 2004).

Furuhata et al., Ridesharing: The state-of-the-art and future directions, transportation Research Part B 57 (2013) 28-46.

Goel, Preeti, Lars Kulik and Kotagiri Ramamohanarao , Optimal pick up point selection for effective ride sharing, IEEEE Transactions on Big Data 3.2 (2016): 154-168 (Year:2016).

Ta, Na, et al. "An efficient ride-sharing framework for maximizing shared route." IEEE Transactions on Knowledge and Data Engineering 30.2 (2017): 219-233. (Year: 2017).

Tong, Wei, Jingyu Hua, and Sheng Zhong. "A jointly differentially private scheduling protocol for ridesharing services." IEEE Transactions on Information Forensics and Security 12.10 (2017): 2444-2456. (Year: 2017).

Ota, Masayo, et al. "Stars: Simulating taxi ride sharing at scale." IEEE Transactions on Big Data 3.3 (2016): 349-361. (Year: 2016).

Freiberg, German, et al. Demand Responsive Transit: Understanding Emerging Solutions, WR, Mexico, May 2021: 1-58.

Sottini, Francesco et al., Andiamo: A multiagent system to provide a mobile-based rideshare service, 2006.

Wang et al., Utilizing taxi empty cruise time to solve the short distance trip problem, ITS World Congress, year 2010.

Celes Clayson Claysonceles@DCC UFMG BR et al: "Mobility Trace Analysis for Intelligent Vehicular Networks", ACM Computing Surveys, ACM, New York, NY, US, US, vol. 54, No. 3, Apr. 17, 2021 (Apr. 17, 2021) pp. 1-38, XP058679020, ISSN: 0360-0300, DOI: 10.1145/3446679.

Rahul Das et al: "Automated Urban Travel Interpretation: A Bottom-up Approach for Trajectory Segmentation", Sensors, vol. 16, No. 11, Nov. 23, 2016 (Nov. 23, 2016), p. 1962, XP055709160, DOI: 10.3390/sl6111962.

Agatz, Niels et al. Sustainable Passenger Transportation: Dynamic Ride-Sharing, Erasmus Research Institute of Management (ERIM) Report Series Research in Management, Feb. 2010, 30 pages.

Yang, Funing, et al. "Future-Aware Balanced Preference Matching for Real-Time On-Demand Taxi Dispatch." IEEE Internet of Things Journal (Year: 2024).

E. Bakiris et al."Clustered-NSGA-II+: A Multi-Objective Evolutionary Genetic Algorithm for Solving the Ride-Sharing Problem with the Same Destination," 2024 15th Inter Conf on Information, Intelligence, Syst & Applications (USA), Chania Crete, Greece, 2024 pp. 1-8, doi: 10.1109 (Year: 2024).

Cheng, Yurong, et al. "Cross Online Ride-Sharing for Multiple-Platform Cooperations in Spatial Crowdsourcing." 2024 IEEE 40th International Conference on Data Engineering (ICDE). IEEE, (Year: 2024).

Amilbek, Nurbolat, et al. "Development of a Deep Learning Model for Forecasting and Optimizing Ride-Sharing Routes." Journal of Problems in Computer Science and Information Technologies 3.1 : 56-71 (Year: 2025).

Minett, Paul, Albany Village and John Pearce, Flexible carpooling: challenging the ride match paradigm, saving energy by making it easier to share rides, Energy Policy Journal 21.3 (2008): 134-159.

Narman, Husnu S., Haroon Malik and Govind Yatnalkar, An enhanced rider sharing model based on human characteristics machine learning recommender system, and user threshold time, Journal of Ambient Intelligence and Humanized Computing, 12.1, 2021:13-26.

Yan, Xiang, Xinyu Liu and Xilei Zhao, Using machine learning for direct modeling of ridesourcing services in Chicago, Journal of Transport Geography 83, 2020:102661.

Final Office Action for U.S. Appl. No. 17/721,562 dated Jun. 13, 2025.

Notice of Allowance for U.S. Appl. No. 16/921,411 dated Jun. 17, 2025.

Notice of Allowance for U.S. Appl. No. 17/856,393 dated Jul. 22, 2025.

Office Action for U.S. Appl. No. 18/326,481 dated Aug. 20, 2025.

Final Office Action for U.S. Appl. No. 18/326,603 dated Jun. 18, 2025.

Office Action for U.S. Appl. No. 17/890,789 dated Aug. 13, 2025.

(56)     References Cited

OTHER PUBLICATIONS

Office Action for U.S. Appl. No. 17/721,562 dated Sep. 26, 2025.
Office Action for U.S. Appl. No. 17/915,735 dated Oct. 14, 2025.
Notice of Allowance for U.S. Appl. No. 17/737,520 dated Oct. 27, 2025.
Shivam, "Optimization of Driver Shift (and Break) Schedule using Simulated Annealing in Ride-Pooling Services", Dec. 2021, Technical University of Munic, pp. 1-88 (Year: 2021).
Office Action for U.S. Appl. No. 18/410,279 dated Mar. 11, 2026.
Office Action for U.S. Appl. No. 17/890,789 dated May 13, 2026.
Office Action for U.S. Appl. No. 18/326,481 dated May 14, 2026.

* cited by examiner

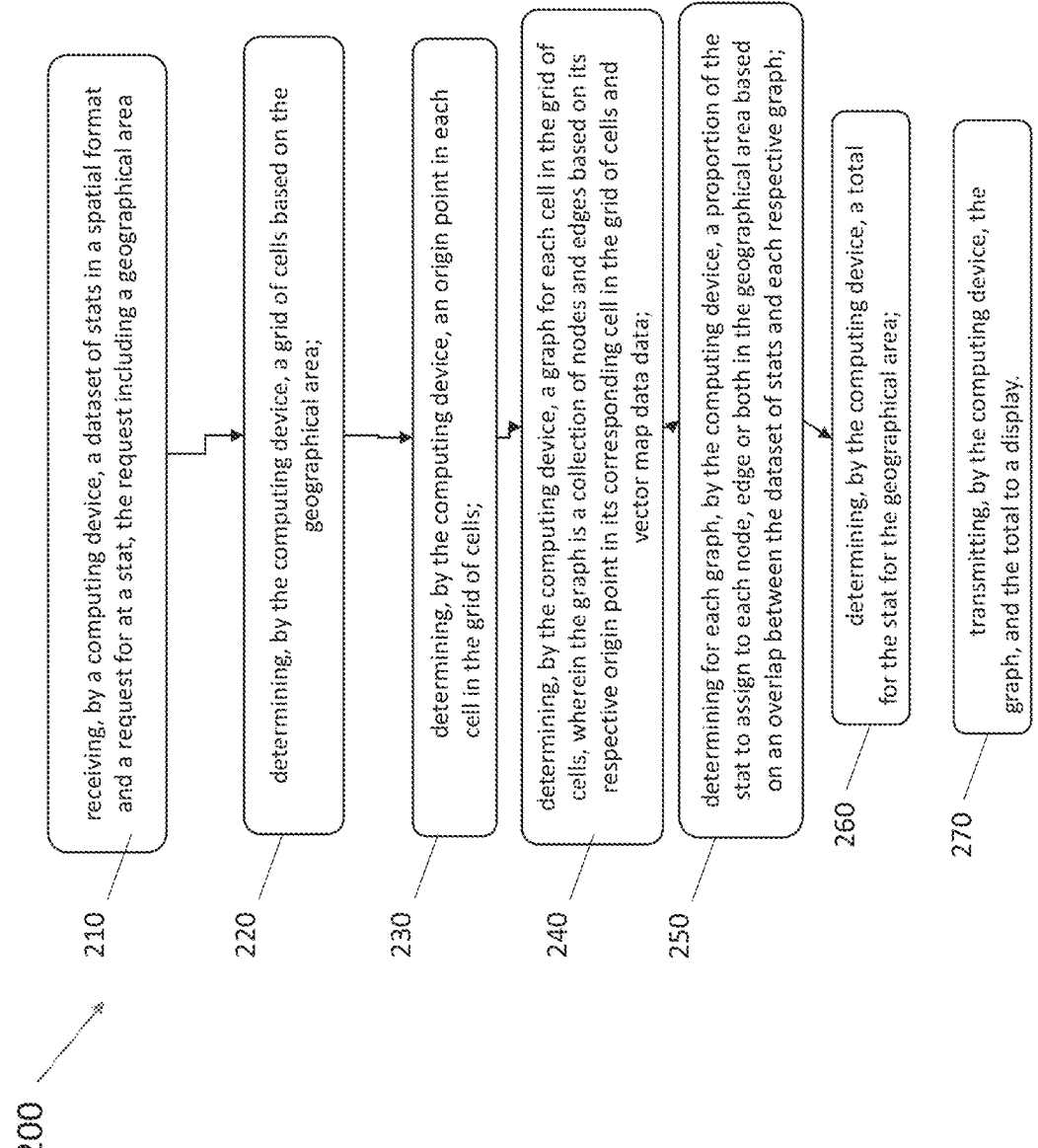

200

210 — receiving, by a computing device, a dataset of stats in a spatial format and a request for at a stat, the request including a geographical area 220 — determining, by the computing device, a grid of cells based on the geographical area;

230 — determining, by the computing device, an origin point in each cell in the grid of cells;

240 — determining, by the computing device, a graph for each cell in the grid of cells, wherein the graph is a collection of nodes and edges based on its respective origin point in its corresponding cell in the grid of cells and vector map data data;

250 — determining for each graph, by the computing device, a proportion of the stat to assign to each node, edge or both in the geographical area based on an overlap between the dataset of stats and each respective graph;

260 — determining, by the computing device, a total for the stat for the geographical area;

270 — transmitting, by the computing device, the graph, and the total to a display.

FIG. 2

SYSTEMS AND METHODS FOR REACHABILITY OF DIFFERENT DESTINATIONS

FIELD OF THE INVENTION

The invention relates generally to systems for geographical statistical determinations for various destinations and planning.

BACKGROUND OF THE INVENTION

Access to destinations and/or resources can be among important outcomes to plan transit around. For example, access to jobs, doctors, hospitals, grocery stores, restaurants, schools, and/or daycares can impact quality of life for populations.

Planning tools can be used to analyze geographical locations and design and/or modify transportation networks to assist populations in having greater accessibilities and/or serving the most people in the population. Typically, large investments are made in funding transportation networks, thus accurate planning is important.

Current planning tools suffer from a variety of problems, including inaccuracies, incomplete information and/or slow operation.

Therefore, it can be desirable to provide planning that is accurate, has complete information, and/or that is able to perform in a realizable amount of time and/or in real-time.

SUMMARY

Advantages of the invention can include planning that is accurate, has complete information, and/or that is able to perform in a realizable amount of time and/or in real-time. Advantages can also include improved speed due to a less expensive calculation in comparison to prior methods.

In one aspect, the invention involves a method for predicting stats for different destinations. The method can also involve receiving, by a computing device, a dataset of stats in a spatial format and a request for at a stat, the request including a geographical area. The method can also involve determining, by the computing device, a grid of cells based on the geographical area. The method can also involve determining, by the computing device, an origin point in each cell in the grid of cells. The method can also involve determining, by the computing device, a graph based on the grid of cells, wherein the graph is a collection of nodes and edges based on the origin points in each cell in the grid of cells and vector map data. The method can also involve determining, by the computing device, a proportion of the stat to assign to each node, edge or both in the geographical area based on an overlap between the dataset of stats and the graph. The method can also involve determining, by the computing device, a total for the stat for the geographical area. The method can also involve transmitting, by the computing device, the graph, and the total to a display.

In some embodiments, the request further comprises a time of day, duration for a trip, one or more mode of transportation or any combination thereof. In some embodiments, the method involves determining an upper bound for each cell in the grid of cells, wherein the upper bound is a maximum distance from the origin point that can be reached in the respective cell.

In some embodiments, the cell is a hexagonal cell. In some embodiments, the method further involves determining for each origin point in each cell, a duration to get to every other node in the graph. In some embodiments, the vector map data is retrieved at a predetermined zoom level. In some embodiments, the stat is user selectable. In some embodiments, the method further involves receiving a plurality of stats, wherein the stat and the plurality of stats include social, economical, demographic, or location based stats. For example, the plurality of stats can include population count, jobs count, percentage of a population under poverty line, percentage of population in particular age group, percentage of population that is part of a particular ethnicity, or any combination thereof.

In some embodiments, the invention includes a system for predicting stats for different destinations. The system can include a processor configured to receive a dataset of stats in a spatial format and a request for at a stat, the request including a geographical area. The processor can be configured to determine a grid of cells based on the geographical area, and determine an origin point in each cell in the grid of cells. The processor can be configured to determine a graph based on the grid of cells, wherein the graph is a collection of nodes and edges based on the origin points in each cell in the grid of cells and vector map data. The processor can be configured to determine a proportion of the stat to assign to each node, edge or both in the geographical area based on an overlap between the dataset of stats and the graph. The processor can be configured to determine a total for the stat for the geographical area and transmit the graph, and the total to a display.

In some embodiments, the request further comprises a time of day, duration for a trip, one or more mode of transportation or any combination thereof. In some embodiments, the processor is further configured to determine an upper bound for each cell in the grid of cells, wherein the upper bound is a maximum distance from the origin point that can be reached in the respective cell. In some embodiments, the cell is a hexagonal cell.

In some embodiments, the processor is further configured to determine for each origin point in each cell, a duration to get to every other node in the graph. In some embodiments, the vector map data is retrieved at a predetermined zoom level. In some embodiments, the stat is user selectable.

In some embodiments, the processor is further configured to receive a plurality of stats, wherein the stat and the plurality of stats include population count, jobs count, percentage of a population under poverty line, percentage of population in particular age group, percentage of population that is part of a particular ethnicity, or any combination thereof.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 2 is a flowchart for a method for predicting stats for different destinations, according to some embodiments of the invention.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

In general, a system and method for predicting stats for different destinations is provided. In general, the system and method can be described as determining for a theoretical person (e.g., avatar Jane as can be displayed to a user) at a user defined starting position, various statistics for Jane's reachability to various destinations. For example, it can be desirable to determine how far Jane can go in an urban center in 30 minutes or 45 minutes, how many jobs are reachable for Jane, how many grocery stores, and/or any statistic analysis (or data item analysis) as is desired.

Figure 1:
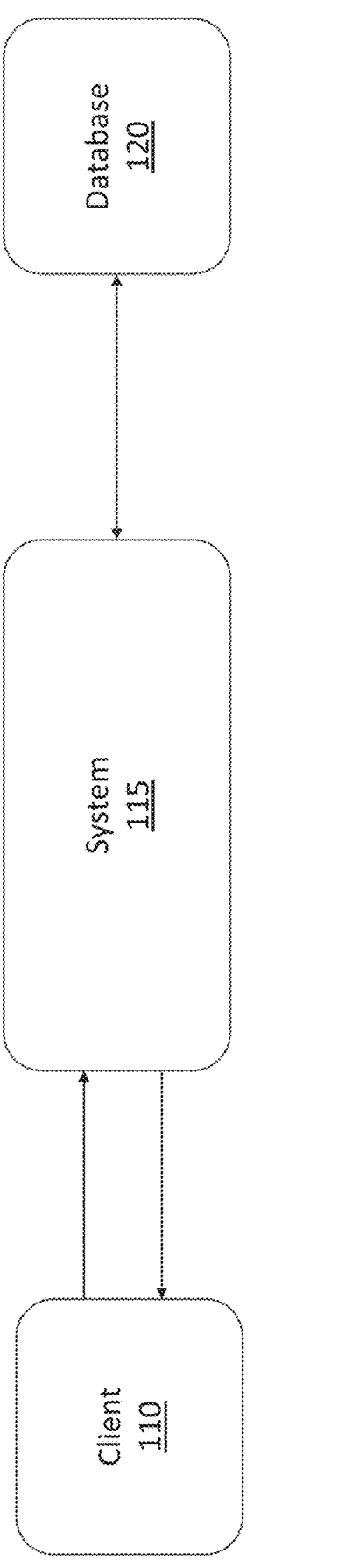
FIG. 1 is a diagram of a system architecture for predicting stats for different destinations, according to some embodiments of the invention.

FIG. 1 is a diagram of a system architecture for predicting stats for different destinations, according to some embodiments of the invention. The system architecture can include a client 110, system 115 having multiple parallel workers running analysis, and a database 120. The client 110 can transmit requests (e.g., request for stat analysis for a particular geographical region) for analysis to the system 115. The system 115 can retrieve data (e.g., data related to the geographical region and analysis) from a database 120.

FIG. 2 is a flowchart for a method 200 for predicting stats for different destinations, according to some embodiments of the invention.

The method can involve receiving a dataset of stats (e.g., from the database 120 as described above in FIG. 1) in a spatial format and a request for at a stat (e.g., from the client 110 as described above in FIG. 1), the request including a geographical area (Step 210).

The dataset of stats can be stats related to any information related to the spatial format. For example, the dataset of stats can include public transportation, public transportation type and public transportation location, community assets, available jobs and corresponding locations, doctors and corresponding locations, supermarkets and corresponding locations, population, percentage of population in poverty, number of senior citizens, number of youths, percentage of car-free households, or any combination thereof. In some embodiments, points based stats can include hospitals, parks, schools, universities, garages, bike lockers and/or other metrics related to locations.

The spatial format of the dataset of stats can be polygonal. The polygonal data can be GeoJson or Shapefile. The dataset of stats can be input by a user, received by another system, or any combination thereof. In various embodiments, the dataset of stats is received in a format other than a GeoJson or Shapefile and the method involves converting the dataset of stats into a GeoJson or Shapefile.

The spatial format of the dataset of stats can be point features. For example, a point of interest (e.g., hospital, police station, etc.).

The dataset of stats can be for a particular geographical region.

The dataset of stats can be input by a user, e.g., a particular entity that desires the analysis be performed. For example, the dataset of stats can be for a city, municipality, public transit system and/or country region. The dataset of stats can be and/or include publicly available data (e.g., census data), private data, or any combination thereof.

The dataset of stats can be received from connected external systems.

In some embodiments, the dataset of stats is stored in a memory.

The geographical area can be input by a user via a user interface. The geographical area can be input by a user via a drag and drop function. For example, turning to FIG. 3, FIG. 3 shows an example of a user interface displaying a geographical region with transit lines indicated, according to some embodiments of the invention.

Figure 3:
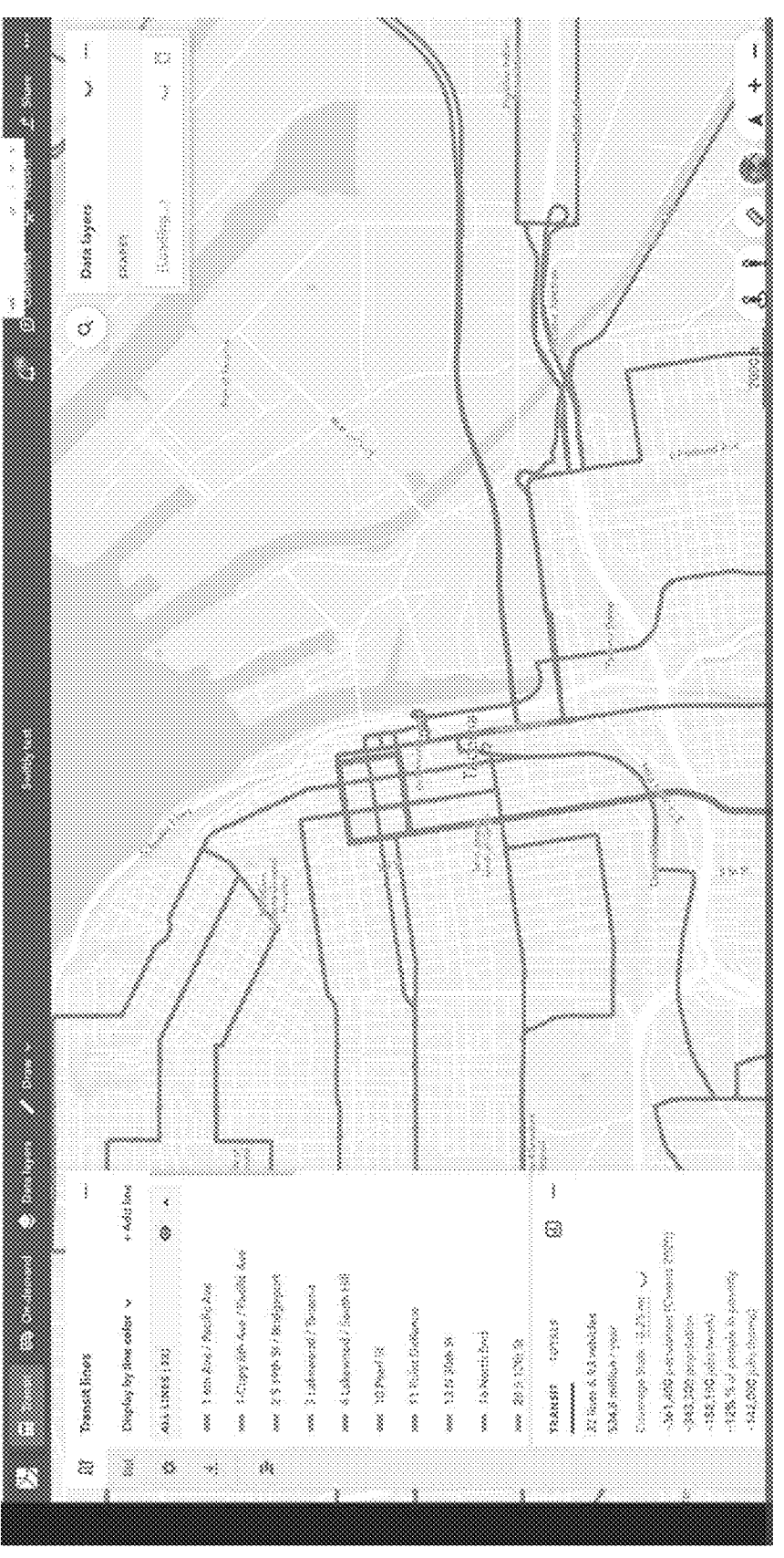
FIG. 3 shows an example of a user interface displaying a geographical region with transit lines indicated, according to some embodiments of the invention.
Figure 4:
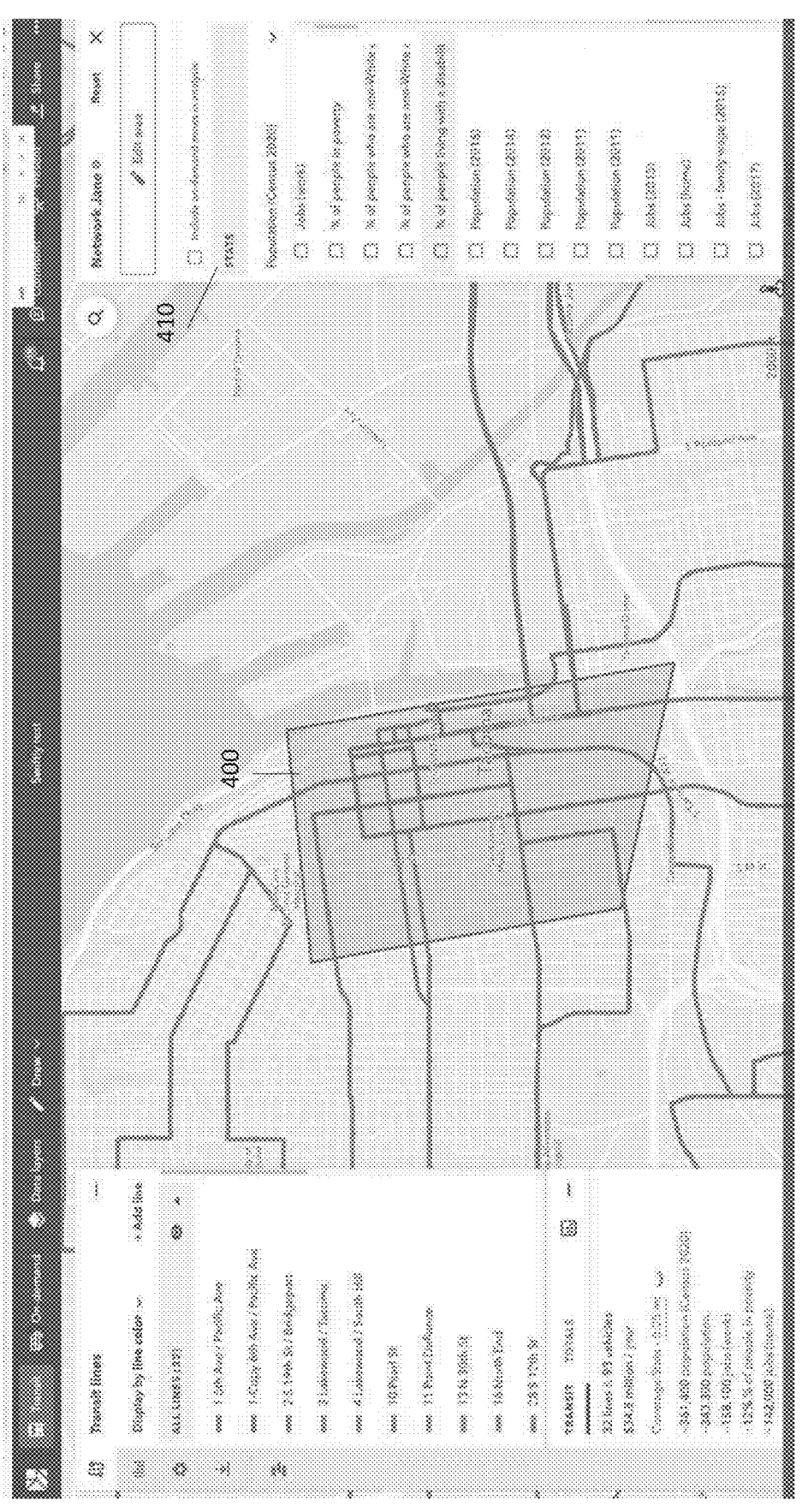
FIG. 4 shows an example of the user interface of FIG. 3 with a geographical area 400 selected within the geographical region, according to some embodiments of the invention.

FIG. 4 shows an example of the user interface of FIG. 3 with a geographical area 400 selected within the geographical region, according to some embodiments of the invention. FIG. 4 also includes a drop down menu 410 of stats. The drop down menu 410 of stats displays the available stats that can be selected. The available stats can correlate to the stats that are available in the dataset of stats, publicly available stats, stored stats or any combination thereof. A request for a stat (or multiple stats) for analysis can be made by selecting one or more stats from the drop down menu 410. In this manner, stats available in the drop down menu 410 can vary.

In some embodiments, the request can include a time of day, duration for a trip, one or more modes of transportation for a trip. In this manner, the method can accommodate a variety of requests. For example, a request can be made for grocery stores within a 30 minute travel distance from each origin (or any combination of origins) at noon.

In some embodiments, the request includes a reachability request such that walkability of a type of destination in a particular time period is requested.

A request can be made for libraries within a 20 minute walk at 3 pm. As is apparent to one of ordinary skill in the art, any combination of inputs described herein can be presented, based on the dataset of stats available and/or input configuration. In some embodiments, if an invalid combination of inputs is selected, an error can be displayed to a user.

Turning back to FIG. 2, the method can also involve determining (e.g., via the system 115 as described above in FIG. 1) a grid of cells based on the geographical area (Step 220). The grid of cells can be a hexagonal grid of cells that overlaps with the geographical area. The grid of cells can be determined based on H3 open source.

In some embodiments, the grid of cells are square, circle, and/or any shape as is known in the art.

Figure 5:
FIG. 5 is an example of the user interface of FIG. 4 with the selected geographical area with a hexagonal grid of cells, according to some embodiments of the invention.

Turning to FIG. 5, FIG. 5 is an example of the user interface of FIG. 4 with the selected geographical area with a hexagonal grid of cells 500, according to some embodiments of the invention.

Turning back to FIG. 2, the method can also involve determining (e.g., via the system 115 as described above in FIG. 1) an origin point in each cell in the grid of cells (Step 230). The origin point can be a center point (e.g., centroid) in each cell.

In some embodiments, the method involves determining an upper bound for each cell in the grid of cells. The upper bound can be for each hex cell the maximum distance that can be traversed within the time duration (e.g., a time duration as specified by a user). The upper bound can be determined using Dijkstra algorithm. For example, the Dijkstra algorithm can be used to figure out how big of an area to analyze (e.g., what specific street segments to include in the analysis and a subsequent vector map data stat assignment). The inputs to the Dijkstra algorithm can include all of the cell origin points and a relevant portion of the transit network (e.g., geographic data).

In some embodiments, the Dijkstra algorithm is used to traverse the transit network with an assumption of "straight-line" walking from the transit stops. In some embodiments, a determination of how far of a distance that can be traversed is made, which can be an overestimation (e.g., since straight-line walking is typically always further than walking through an actual street network). The overestimation can be the upper bound.

The method can also involve determining (e.g., via the system 115 as described above in FIG. 1), a graph for each cell in the grid of cells, wherein each graph is a collection of nodes and edges based on its respective origin point in its corresponding cell in the grid of cells and vector map data (Step 240). For example, one or more nodes can be an intersection of streets. Vector map data can represent street segments as edges and their meeting points as nodes. In some embodiments, a street block between two stop signs can be an edge.

In various embodiments, the vector map data is roadway data, transit line data, and/or walkable walking paths. In some embodiments, the vector map data is OSM data.

The vector map data can be retrieved from a database. The vector map data can be, as is known in the art, from publicly available databases. In some embodiments, for example, demographic data can be at the block level. In various embodiments, the vector map data is retrieved at a zoom level based on a population level of the area within the geographical area. For example, in an urban environment the zoom level can be higher, whereas in a rural environment the zoom level can be lower.

The method can also involve determining how long it takes to get from each origin point of each hex cell to each node in the graph. The determination can be made via a Dijkstra algorithm.

The method can also involve determining for each graph (e.g., via the system 115 as described above in FIG. 1) a proportion of the stat to assign to each node, edge or both in the geographical area based on an overlap between the dataset of stats and each respective graph (Step 250). In some embodiments, where more than one stat is selected, the method can involve for each selected stat, determining a portion of the stat to assign to each node, edge or both in the geographical area.

Once all of the stats are collected for each graph, an average can be used to determine a final set of stats.

Figure 6C:
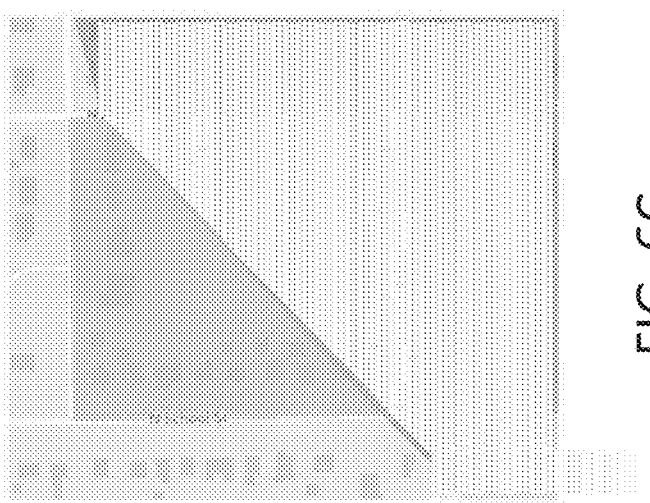
FIG. 6C shows an example of a total for the stat for the geographical area of FIG. 6B, according to some embodiments of the invention.
Figure 6B:
FIG. 6B shows a proportion of a polygon dataset of stats assigned to each edge in the portion of the geographical area of FIG. 6A, that overlaps with the portion of the spatial location, according to some embodiments of the invention.
Figure 6A:
FIG. 6A shows a portion of the geographical area that overlaps with a portion of a spatial location of a polygon dataset of stats, according to some embodiments of the invention.

For example, assume an example of request to determine a stat of accessibility to jobs in a geographical area (e.g., a geographical area as selected by a user) for a polygon dataset of stats having the stat of jobs. Turning to FIGS. 6A and 6B, FIG. 6A shows a portion of the geographical area that overlaps with a portion of the spatial location of the polygon dataset of stats with 12 jobs and FIG. 6B shows a proportion of the polygon dataset of stats assigned to each edge in the portion of the geographical area that overlaps with the portion of the spatial location, according to some embodiments of the invention.

The geographical area can be selected such that it substantially overlaps with the spatial location of the polygon dataset of stats. In some embodiments, a buffer can be included, the buffer can be a portion of the geographical area that does not overlap with the spatial location of the polygon dataset of stats but that is included to ensure that street segments which travel along a boundary of a polygon feature are considered. The buffer distance can be input by a user, for example, 15 meters.

For the spatial location polygon dataset of stats of the 12 jobs there are 14 relevant edges (e.g., street segments) in the geographical area. Each edge goes between two intersections, no matter how small it may be, e.g. the tiny segment of North Fell Ave between Gregory and Norwood is considered an edge. Edges can be determined based on what streets "touch" the buffer area. The percentages can be the particular segment's length compared to the total length of all segments touched by the buffer area. For example, if all segments inside the buffer area add up to 200 m, and the part of North School Street inside the buffer area is 50 m, then 25% can be assigned to that edge. Subsequently, this edge can have 25% of the stat value assigned to the original dataset feature.

FIG. 6B shows the percentage of the 12 jobs that belong to each segment.

Turning back to FIG. 2, the method can also involve determining (e.g., via the system 115 as described above in FIG. 1) a total for the stat for the geographical area (Step 260). For example, continuing with the example above in FIG. 6B, turning to FIG. 6C, where the inquiry is how many of the jobs are accessible, 7% of N. School street, all of Gregory St., and 95% of N. Fell Ave. is accessible as shown by the line pattern section 610. Thus, (25%*12)*7%+ (20%*12)*100%+(24%*12)*95%=5.35 jobs out of the 12 jobs are accessible.

The method can also involve determining transmitting, by the computing device, the graph, and the total to a display (Step 270).

For example, assume an example of request to determine a stat of accessibility to jobs in a geographical area (e.g., a geographical area as selected by a user) for a polygon dataset of stats having the stat of jobs.

Figure 7B:
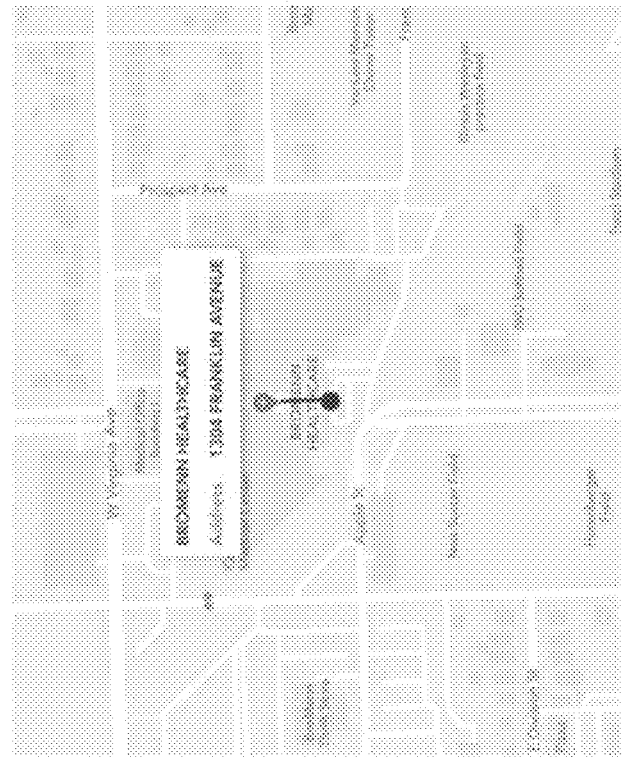
FIG. 7A and FIG. 7B show examples of a geographical area with a point feature of a hospital, and moving the hospital to a vector map data segment, according to some embodiments of the invention.
Figure 7A:
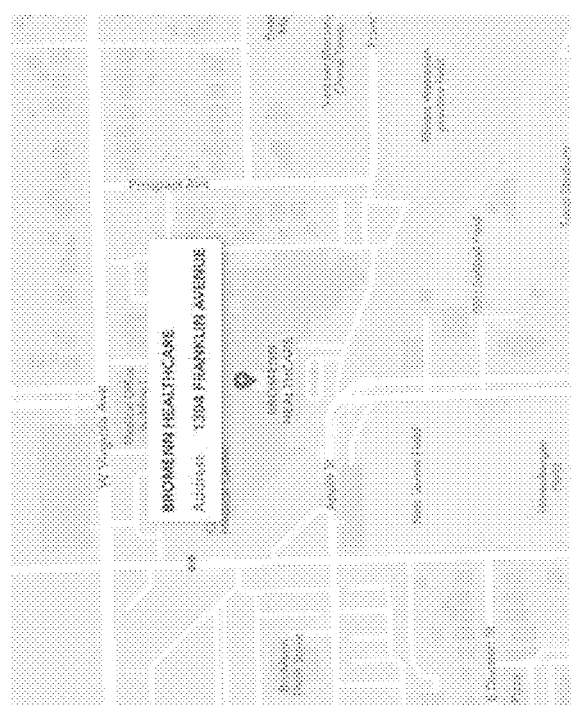

In some embodiments, the dataset of stats includes and/or is point features (e.g., a hospital, a library and/or any point within a location). For a point feature, it can be moved to the closest vector map segment. In some embodiments, each point feature is moved to the closest segment every 100 meters along that segment. For example, turning to FIG. 7A and FIG. 7B, FIG. 7A and FIG. 7B show examples of a geographical area with a point feature of a hospital, and moving the hospital to the vector map segment, according to some embodiments of the invention.

In some embodiments, a path can be determined to reachable nodes using a Dijkstra algorithm, as is known in the art. The reachable nodes can be used to determine multiple paths from a first location to each reachable node. For each of the multiple paths, sum the stats along interconnecting segments on the path, and assign the summed to the respective path. Select the path of the multiple paths that corresponds to the request as being the path.

For example, assume a request to determine a walking route to a subway stop with the most daycares within a walking distance of 45 minutes from the first location. The Dijkstra algorithm can be used to determine reachable nodes (e.g., locations that are reachable within 45 minutes). The number of those paths that have both subway stations and daycare centers can be determined, as described above, by summing the stat of daycare centers and the stat of subway stations of segments along the path from the starting location to the reachable nodes. The path with a subway station and the most number of daycares can be selected (e.g., second location being the corresponding reachable node used to determine the stats) and output to a display.

In some embodiments, every stat that is determined for each reachable node can be transmitted to the display. In some embodiments, continuing with the example above, a map with the starting location highlighted (e.g., with a person symbol on it) can be displayed and each path can be highlighted with the associated stat displayed next to the path to visualize all of the determined stats (e.g., daycares and subway stops) for all reachable nodes. In some embodiments, only the path is highlighted and the stats are displayed when a cursor is positioned on the path.

Figure 7C:
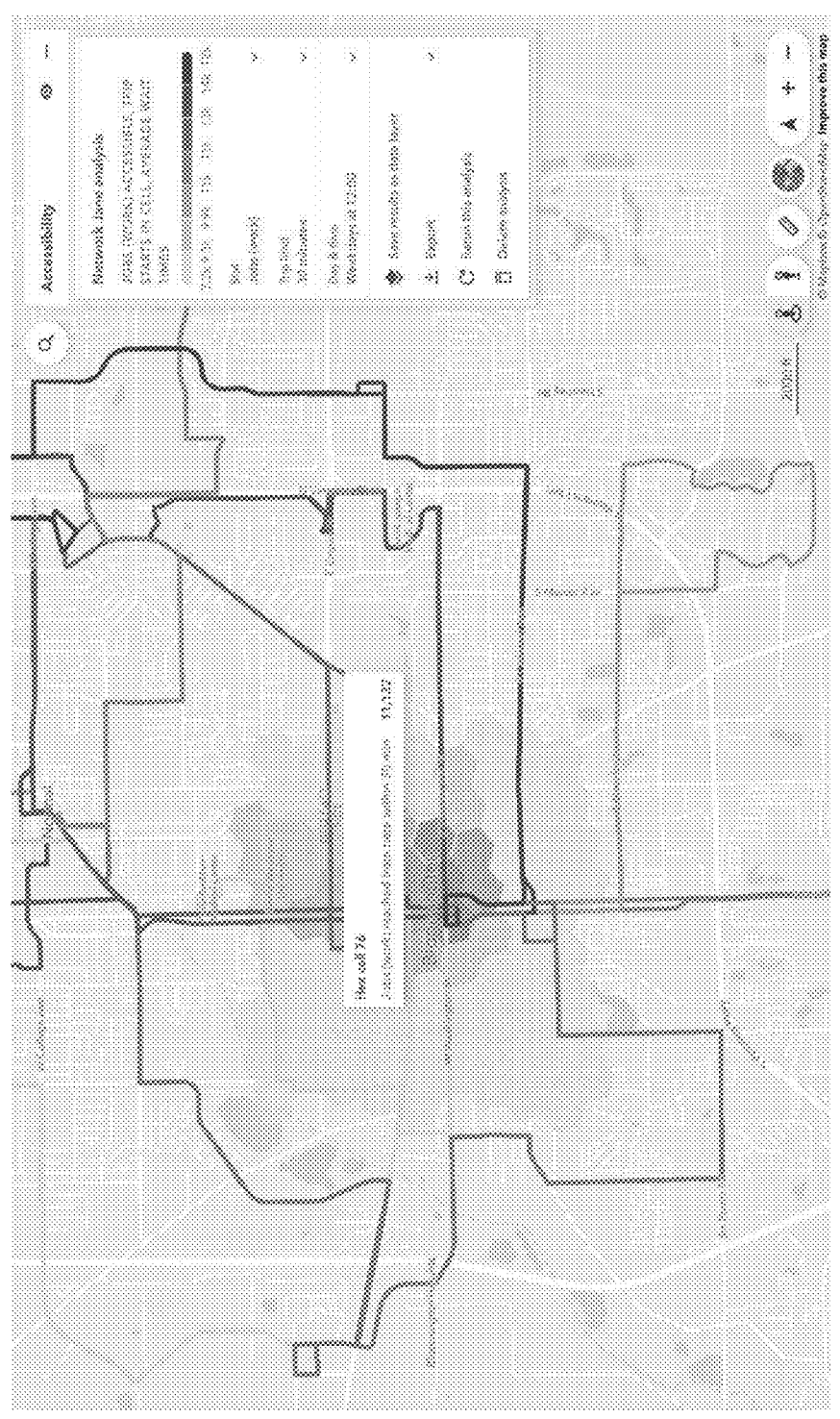
FIG. 7C is an example of a display showing the stat of jobs accessible where the trip starts in the cell in a particular geographical region, according to some embodiments of the invention.
Figure 7D:
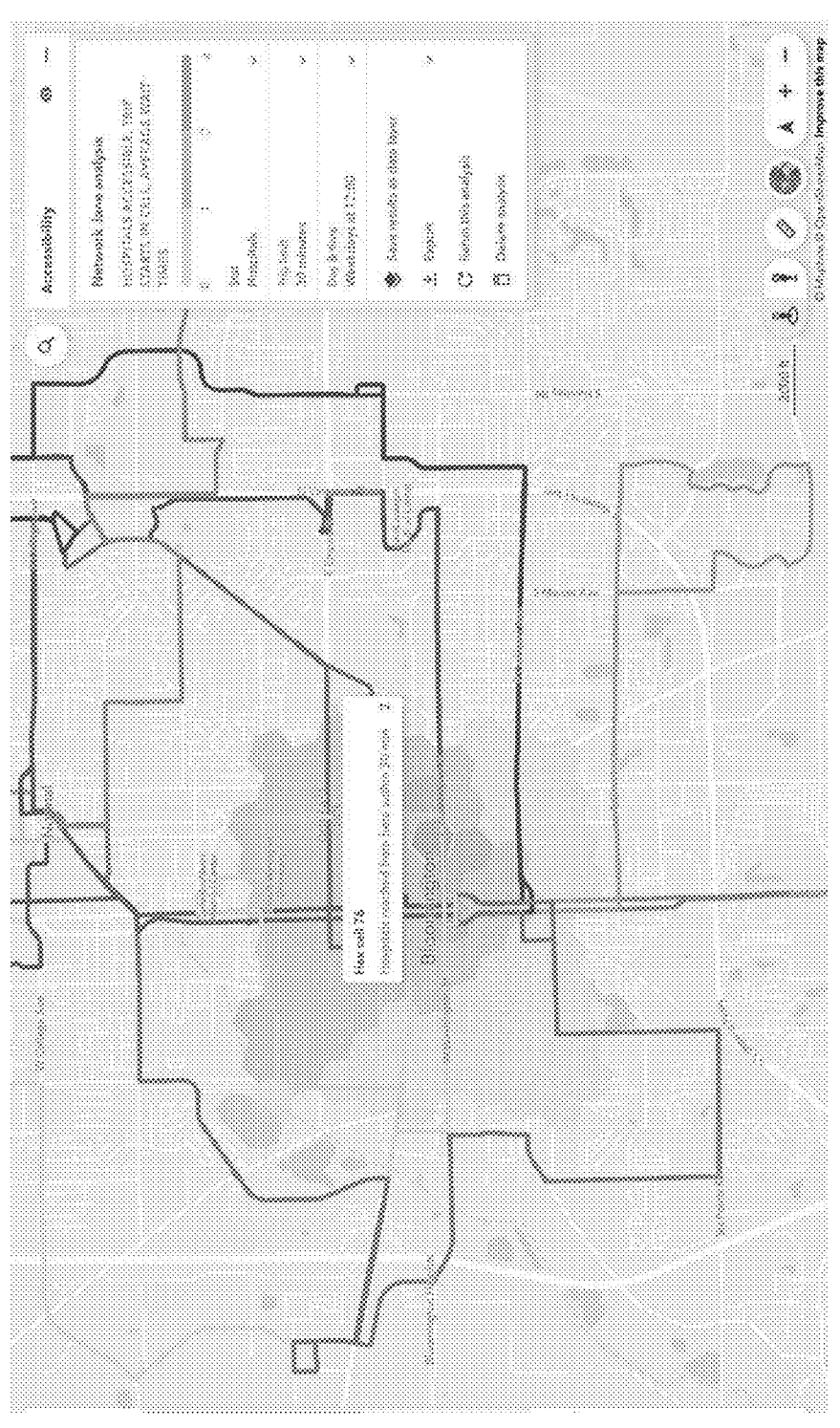
FIG. 7D is an example of the display of FIG. 7C with the stat of hospitals accessible where the trip starts in the same cell in the particular geographical region, according to some embodiments of the invention.

FIG. 7C is an example of a display showing the stat of jobs accessible where the trip starts in the cell in a particular geographical region, according to some embodiments of the invention. FIG. 7D is an example of the display of FIG. 7C with the stat of hospitals accessible where the trip starts in the same cell in the particular geographical region, according to some embodiments of the invention.

In some embodiments, it can be desirable to determine stats only along a walkable path rather than, for example, over an entire geographical region and/or a larger geographical region than the specified reachable path to, for example, reduce the number of computations. In some embodiments, it can be desirable to determine the stats in real-time rather than precompute the stats. For example, for a newly received dataset of stats for a system that is providing output being used in real-time (e.g., stats are related to accessibility to transit).

Figure 8:
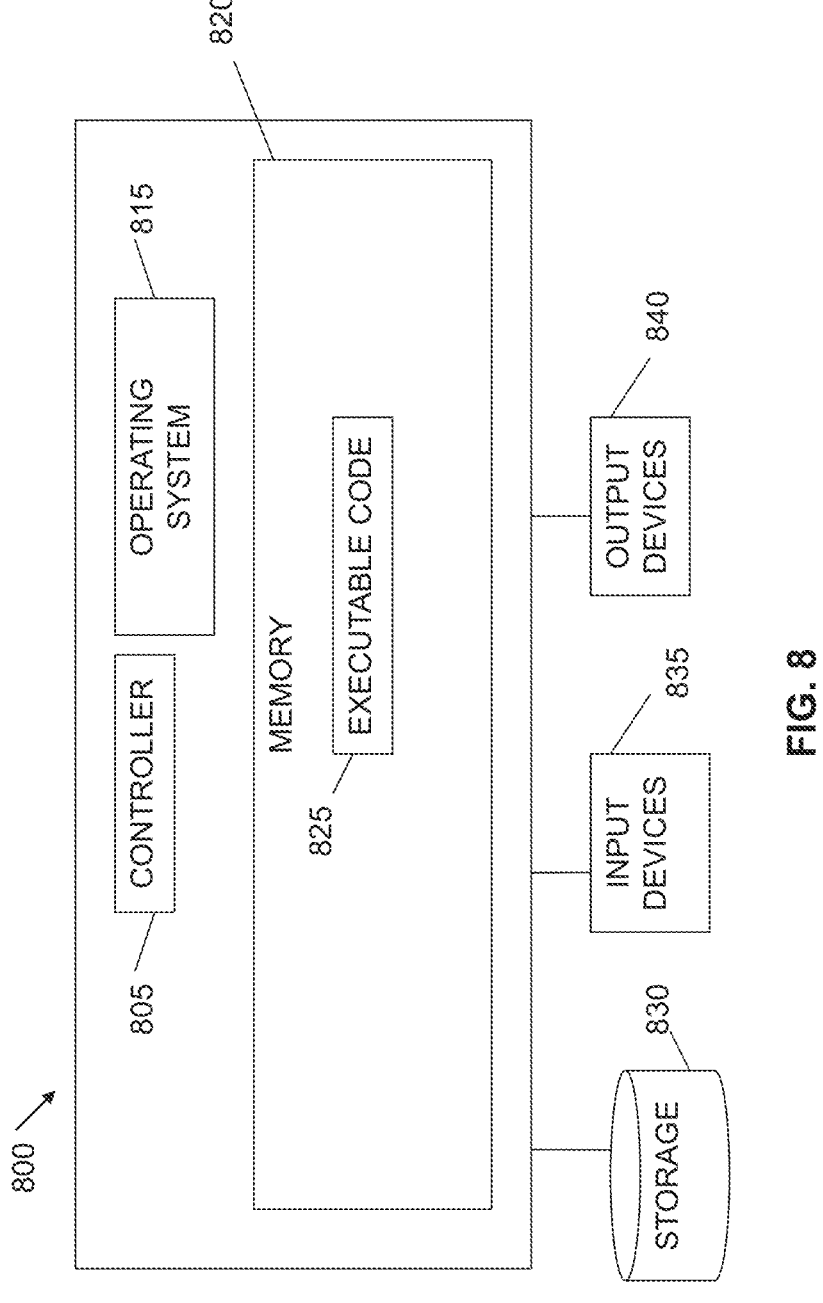
FIG. 8 shows a block diagram of a computing device 800 which can be used with embodiments of the invention.

FIG. 8 shows a block diagram of a computing device 800 which can be used with embodiments of the invention. Computing device 800 can include a controller or processor 805 that can be or include, for example, one or more central processing unit processor(s) (CPU), one or more Graphics Processing Unit(s) (GPU or GPGPU), a chip or any suitable computing or computational device, an operating system 815, a memory 820, a storage 830, input devices 835 and output devices 840.

Operating system 815 can be or can include any code segment designed and/or configured to perform tasks involving coordination, scheduling, arbitration, supervising, controlling or otherwise managing operation of computing device 800, for example, scheduling execution of programs. Memory 820 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 820 can be or can include a plurality of, possibly different memory units. Memory 820 can store for example, instructions to carry out a method (e.g. code 825), and/or data such as user responses, interruptions, etc.

Executable code 825 can be any executable code, e.g., an application, a program, a process, task or script. Executable code 825 can be executed by controller 805 possibly under control of operating system 815. For example, executable code 825 can when executed cause masking of personally identifiable information (PII), according to embodiments of the invention. In some embodiments, more than one computing device 800 or components of cpmputing device 800 can be used for multiple functions described herein. For the various modules and functions described herein, one or more computing devices 800 or components of computing device 800 can be used. Devices that include components similar or different to those included in computing device 800 can be used, and can be connected to a network and used as a system. One or more processor(s) 805 can be configured to carry out embodiments of the invention by for example executing software or code. Storage 830 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 830 and can be loaded from storage 830 into a memory 820 where it can be processed by controller 805. In some embodiments, some of the components shown in FIG. 8 can be omitted.

Input devices 835 can be or can include for example a mouse, a keyboard, a touch screen or pad or any suitable input device. It will be recognized that any suitable number of input devices can be operatively connected to computing device 800 as shown by block 835. Output devices 840 can include one or more displays, speakers and/or any other suitable output devices. It will be recognized that any suitable number of output devices can be operatively connected to computing device 800 as shown by block 840. Any applicable input/output (I/O) devices can be connected to computing device 800, for example, a wired or wireless network interface card (NIC), a modem, printer or facsimile machine, a universal serial bus (USB) device or external hard drive can be included in input devices 835 and/or output devices 840.

Embodiments of the invention can include one or more article(s) (e.g. memory 820 or storage 830) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device.

Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stored on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A method for predicting stats for different destinations in real-time, the method comprising:

receiving, by a computing device, a dataset of stats in a spatial format and a request for a prediction of a stat over a starting position and destination, the request including a geographical area including the starting position and destination;

determining, by the computing device, a grid of cells based on the geographical area;

determining, by the computing device, an origin point in each cell in the grid of cells, wherein the origin point is a centroid of the respective cell;

determining an upper bound for each cell in the grid of cells, wherein the upper bound is a maximum distance from the origin point that can be reached in the respective cell;

determining, by the computing device, a graph for each cell in the grid of cells, wherein each graph is a collection of nodes and edges based on its respective upper bound of the origin point in its corresponding cell in the grid of cells and vector map data;

determining for each graph, by the computing device, an overlap between the spatial location of the dataset of stats and each respective graph;

determining, by the computing device, a proportion of the requested stat to assign to each node, edge or both in the geographical area based on a number of nodes, number of edges or both in the overlap;

determining, by the computing device, a total for the stat between the starting position and the destination for the geographical area; and transmitting, in real-time, by the computing device, the graph that includes the starting position and the destination, and the total to a display.

2. The method of claim 1 wherein the request further comprises a time of day, duration for a trip, one or more mode of transportation or any combination thereof.

3. The method of claim 1 wherein the cell is a hexagonal cell.

4. The method of claim 1 further comprising determining for each origin point in each cell, a duration to get to every other node in the graph.

5. The method of claim 1 wherein the vector map data is retrieved at a predetermined zoom level.

6. The method of claim 1 further comprising receiving a plurality of stats, wherein the stat and the plurality of stats include population count, jobs count, percentage of a population under poverty line, percentage of population in particular age group, percentage of population that is part of a particular ethnicity, or any combination thereof.

7. The method of claim 1 wherein the requested stat is how many jobs are reachable within a time duration from the starting position.

8. The method of claim 1 wherein the dataset of stats is received from a connected external system.

9. The method of claim 1 further comprising populating a drop down menu of a graphical user interface with a list of available stats based on the received dataset of stats.

10. The method of claim 2 wherein the stat is user selectable.

11. A system for predicting stats in real-time for different destinations, the system comprising:

a processor configured to:

receive a dataset of stats in a spatial format and a request for a prediction of a stat over a starting position and destination, the request including a geographical area including the starting position and destination;

determine a grid of cells based on the geographical area;

determine an origin point in each cell in the grid of cells, wherein the origin point is a centroid of the respective cell;

determine an upper bound for each cell in the grid of cells, wherein the upper bound is a maximum distance from the origin point that can be reached in the respective cell;

determine a graph for each cell in the grid of cells, wherein the graph is a collection of nodes and edges based on its respective upper bound of the origin point in its corresponding cell in the grid of cells and vector map data;

determine, for each graph, an overlap between the spatial location of the dataset of stats and each respective graph;

determine a proportion of the requested stat to assign to each node, edge or both in the geographical area based on a number of nodes, number of edges or both in the overlap;

determine a total for the stat between the starting position and the destination for the geographical area; and transmit in real-time the graph that includes the starting position and the destination, and the total to a display.

12. The system of claim 11 wherein the request further comprises a time of day, duration for a trip, one or more mode of transportation or any combination thereof.

13. The system of claim 11 wherein the processor is further configured to determine an upper bound for each cell in the grid of cells, wherein the upper bound is a maximum distance from the origin point that can be reached in the respective cell.

14. The system of claim 11 wherein the cell is a hexagonal cell.

15. The system of claim 11 wherein the processor is further configured to determine for each origin point in each cell, a duration to get to every other node in the graph.

16. The system of claim 11 wherein the vector map data is retrieved at a predetermined zoom level.

17. The system of claim 11 wherein the stat is user selectable.

18. The system of claim 11 wherein the processor is further configured to receive a plurality of stats, wherein the stat and the plurality of stats include population count, jobs count, percentage of a population under poverty line, percentage of population in particular age group, percentage of population that is part of a particular ethnicity, or any combination thereof.

* * * * *